United States Patent
Zhao et al.

(10) Patent No.: US 10,909,379 B2
(45) Date of Patent: Feb. 2, 2021

(54) IMAGE PROCESSING APPARATUS AND METHOD, AND STORAGE MEDIUM STORING INSTRUCTION

(71) Applicant: CANON KABUSHIKI KAISHA, Tokyo (JP)

(72) Inventors: Xuyu Zhao, Beijing (CN); Qiao Wang, Beijing (CN)

(73) Assignee: Canon Kabushiki Kaisha, Tokyo (JP)

( * ) Notice: Subject to any disclaimer, the term of this patent is extended or adjusted under 35 U.S.C. 154(b) by 141 days.

(21) Appl. No.: 16/353,947

(22) Filed: Mar. 14, 2019

(65) Prior Publication Data

US 2019/0294884 A1  Sep. 26, 2019

(30) Foreign Application Priority Data

Mar. 22, 2018 (CN) .......................... 2018 1 0240614
Oct. 30, 2018 (CN) .......................... 2018 1 1277406

(51) Int. Cl.

| G06K 9/00 | (2006.01) |
|---|---|
| G06T 7/194 | (2017.01) |
| G06T 5/00 | (2006.01) |
| G06T 7/254 | (2017.01) |
| G06K 9/03 | (2006.01) |

(52) U.S. Cl.
CPC ..... *G06K 9/00744* (2013.01); *G06K 9/00718* (2013.01); *G06K 9/03* (2013.01); *G06T 5/009* (2013.01); *G06T 7/194* (2017.01); *G06T 7/254* (2017.01); *G06T 2207/20021* (2013.01); *G06T 2207/20182* (2013.01); *G06T 2207/30232* (2013.01)

(58) Field of Classification Search
CPC .. G06K 9/00744; G06K 9/00718; G06K 9/03; G06T 7/254; G06T 7/194; G06T 5/009; G06T 2207/30232; G06T 2207/20182; G06T 2207/20021
USPC ....................................................... 382/103
See application file for complete search history.

(56) References Cited

U.S. PATENT DOCUMENTS

| 8,818,108 B2 | 8/2014 | Suzuki et al. | |
| 2001/0043738 A1* | 11/2001 | Sawhney | ................ G01S 5/163 382/154 |

(Continued)

FOREIGN PATENT DOCUMENTS

| JP | 2009265827 A | 11/2009 |
| JP | 2011209966 A | 10/2011 |

*Primary Examiner* — Jerome Grant, II
(74) *Attorney, Agent, or Firm* — Canon U.S.A., Inc.

(57) ABSTRACT

An image processing apparatus for acquiring a current video frame and a scene model based on an input video; determining, based on visual elements in the current video frame, visual element models in the scene model to be visual element models necessary to be corrected and visual element models unnecessary to be corrected; and correcting the visual element models necessary to be corrected based on reference visual element models, wherein the reference visual element models are visual element models in the scene model that are determined to be the visual element models unnecessary to be corrected based on each of the current video frame and its previous video frames, similarities among the appearance features of the reference visual element models and the visual element models necessary to be corrected in the previous video frames satisfy a predetermined condition.

10 Claims, 7 Drawing Sheets

(56) References Cited

U.S. PATENT DOCUMENTS

| | | |
|---|---|---|
| 2009/0087086 A1 | 4/2009 | Eaton et al. |
| 2010/0150526 A1* | 6/2010 | Rose .................... G11B 27/034 |
| | | 386/352 |
| 2012/0106837 A1 | 5/2012 | Partis et al. |
| 2012/0288198 A1 | 11/2012 | Tojo et al. |
| 2013/0101208 A1 | 4/2013 | Feris et al. |
| 2017/0213100 A1* | 7/2017 | Yun .......................... G06K 9/38 |
| 2018/0262745 A1* | 9/2018 | Cole .................... H04N 13/156 |
| 2019/0294884 A1* | 9/2019 | Zhao .................. G06K 9/00718 |
| 2019/0295323 A1* | 9/2019 | Gutierrez ............ G06F 3/04815 |
| 2020/0169718 A1* | 5/2020 | Begeja ................ G06K 9/4642 |
| 2020/0244993 A1* | 7/2020 | Schwarz ................. G06T 15/20 |

\* cited by examiner

IMAGE PROCESSING APPARATUS AND METHOD, AND STORAGE MEDIUM STORING INSTRUCTION

CROSS-REFERENCE TO RELATED APPLICATIONS

This application claims the benefit of Chinese Patent Application No. 201810240614.5, filed Mar. 22, 2018, and Chinese Patent Application No. 201811277406.9, filed Oct. 30, 2018, which are hereby incorporated by reference herein in their entirety.

BACKGROUND OF THE INVENTION

Field of the Invention

The present invention relates to an image processing apparatus and an image processing method.

Description of the Related Art

In image processing, on the one hand, an image (e.g., one video frame in a video) is typically composed of several visual elements, which are visible elements that contribute to the expression of the image. Herein, one visual element may be, for example, one pixel, a discrete cosine transform (DCT) block representing a group of pixels, or a super pixel representing a group of pixels having similar attributes (e.g., similar texture, similar color, similar illumination). On the other hand, especially in video surveillance, the existing background subtraction technique is typically used to detect the visual elements in a certain video frame in the video as foreground or background by comparing the video frame with a scene model obtained based on video frames which are within a certain duration before the video frame in the video. Herein, the foreground refers to a transient object that appears in the scene captured on the video. Such transient object may include, for example, a moving person or object. The remaining part in the scene is considered the background. In practical applications, some visual elements that are actually background will be erroneously detected as foreground due to the change in the environment illumination, which will affect the accuracy of foreground detection.

In order to reduce the influence of the change in the environment illumination, U.S. Pat. No. 8,818,108 B2 exemplarily discloses a method of correcting visual elements. The method mainly includes: for one visual element of interest in a certain video frame in the video, firstly, determining one pattern to be processed including the visual element of interest from the video frame, wherein the pattern to be processed further includes other visual elements most relevant to the visual element of interest; secondly, determining one reference pattern similar to the pattern to be processed, from previous video frames of the video frame, wherein the reference pattern includes a visual element corresponding to the visual element of interest and other visual elements most relevant to the visual element in the previous video frames; then, adding the pixel values of the pattern to be processed and the reference pattern to correct the pixel value of the visual element of interest. Thus, for example, in the foreground detection, the influence of the change in the environment illumination on the foreground detection may be reduced according to the corrected visual element.

However, under some circumstances, when the environment illumination changes, the influence caused by the change in the environment illumination cannot be well reduced according to the exemplary method described above. For example, for a certain visual element that is actually background in a video frame, the visual element will be erroneously detected as foreground when it is occluded by a foreground object (for example, a person, an object, or even a shadow projected from the sky, etc.) and then reappears. On the one hand, it is difficult to find a similar reference pattern that can be used to correct the visual element in adjacent video frames of the video frame in which the visual element reappears. On the other hand, even if a similar reference pattern can be found in a certain previous video frame, the reference pattern cannot well play a role of correcting the visual element due to the long time interval between the previous video frame and the video frame in which the visual element reappears.

SUMMARY OF THE INVENTION

In view of the above description of the related art, the present disclosure is directed to solve at least one of the above issues.

According to an aspect of the present disclosure, there is provided an image processing apparatus comprising: an acquisition unit that acquires a current video frame and a scene model based on an input video, wherein the scene model includes visual element models that represent at least appearance features of visual elements in the current video frame and its previous video frames; a determination unit that determines, based on the visual elements in the current video frame, the visual element models in the scene model to be visual element models necessary to be corrected and visual element models unnecessary to be corrected; and a correction unit that corrects the visual element models necessary to be corrected based on reference visual element models, wherein the reference visual element models are visual element models in the scene model, that are determined to be the visual element models unnecessary to be corrected based on each of the current video frame and its previous video frames, and wherein similarities among the appearance features of the reference visual element models and the visual element models necessary to be corrected in the previous video frames, satisfy a predetermined condition.

According to another aspect of the present disclosure, there is provided an image processing method comprising: an acquiring step of acquiring a current video frame and a scene model based on an input video, wherein the scene model includes visual element models that represent at least appearance features of visual elements in the current video frame and its previous video frames; a determining step of determining, based on the visual elements in the current video frame, the visual element models in the scene model to be visual element models necessary to be corrected and visual element models unnecessary to be corrected; and a correcting step of correcting the visual element models necessary to be corrected based on reference visual element models, wherein the reference visual element models are visual element models in the scene model, that are determined to be the visual element models unnecessary to be corrected based on each of the current video frame and its previous video frames, and wherein similarities among the appearance features of the reference visual element models and the visual element models necessary to be corrected in the previous video frames, satisfy a predetermined condition.

According to still another aspect of the present disclosure, there is provided a storage medium storing an instruction for enabling an image processing method as described above to be executed when executed by a processor.

Herein, the appearance features of the visual elements in the video frame include any one of color feature, texture feature, and illumination feature.

With the present disclosure, it is possible to correct incorrect or unreliable visual element models in the scene model.

Other features and advantages of the present disclosure will become apparent from the following description of typical embodiments with reference to the accompanying drawings.

BRIEF DESCRIPTION OF THE DRAWINGS

The accompanying drawings, which are incorporated in and constitute a part of the specification, illustrate embodiments of the present disclosure and, together with the description of embodiments, serve to explain the principles of the present disclosure.

DESCRIPTION OF THE EMBODIMENTS

Figure 1:
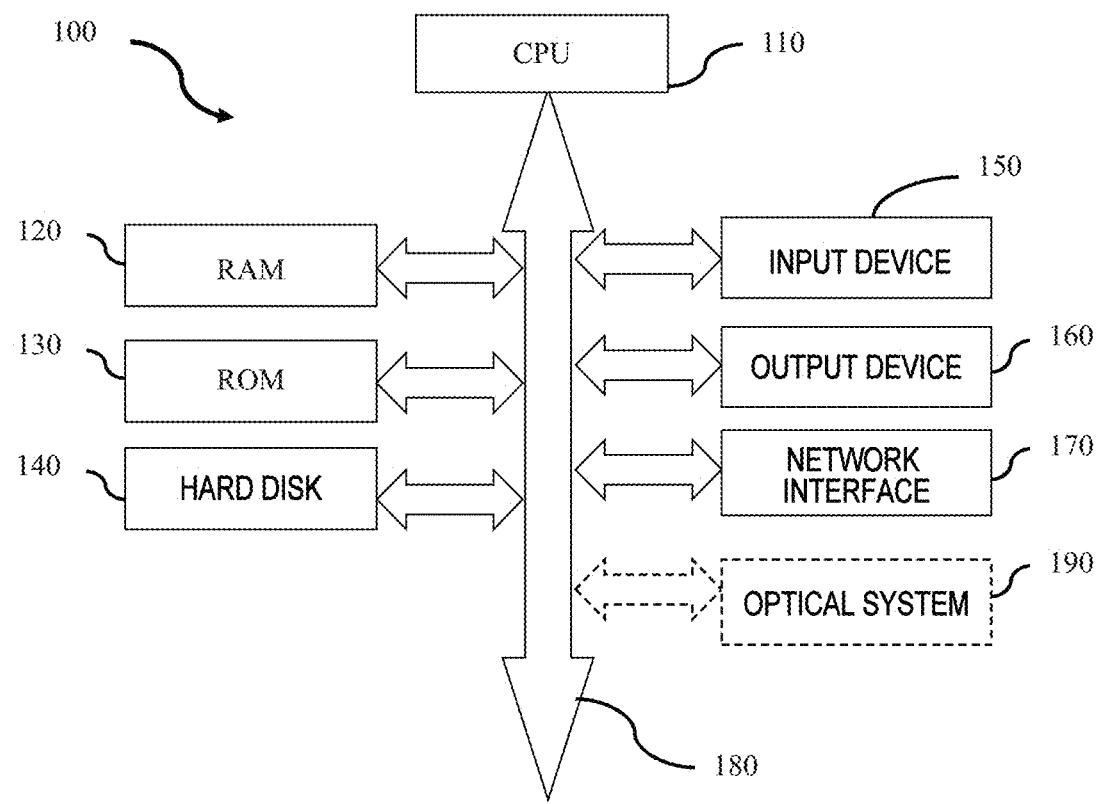
FIG. 1 is a block diagram schematically showing a hardware configuration which may implement the technique according to an embodiment of the present disclosure.

Exemplary embodiments of the present disclosure will be described in detail below with reference to the accompanying drawings. It should be noted that the following description is essentially merely illustrative and exemplary, and is in no way intended to limit the disclosure and its application or use. The relative arrangement of the components and steps, numerical expressions and numerical values set forth in the embodiments do not limit the scope of the disclosure, unless specified otherwise. In addition, techniques, methods, and devices known to those skilled in the art may not be discussed in detail, but should be a part of the specification as appropriate.

It is noted that similar reference numerals and letters refer to similar items in the drawings, and therefore, once an item is defined in one figure, it is not necessary to discuss it in the following figures.

The inventor believes that, in a video, no matter how the environment illumination changes, and no matter whether some visual elements in the video are occluded by a foreground object (for example, a person, an object, or even a shadow projected from the sky, etc.), there are always some visual elements that can change following closely the change in the environment illumination, in a segment of continuous video frames. That is to say, in a segment of continuous video frames, no matter how the environment illumination therein changes, there are always some visual elements that can change following closely the change in the environment illumination such that visual element models corresponding to these visual elements in the scene model can also always change following closely the change in the environment illumination, where such visual element models can be considered as correct or reliable visual element models. However, as for visual element models in the scene model that cannot change following closely the change in the environment illumination (for example, corresponding visual elements in the video are occluded by a foreground object), such visual element models can be considered as visual element models that become incorrect or unreliable due to the change of the environment. If associated visual element models (hereinafter referred to as "reference visual element models") can be found from those visual element models described above that can change following closely the change in the environment illumination to correct these incorrect or unreliable visual element models, it may be possible to effectively reduce the influence of the change in environment illumination on subsequent operation (e.g., foreground detection), thereby improving the processing accuracy of the subsequent operation (e.g., foreground detection).

Exemplary embodiments of the present disclosure will be described in detail below with reference to the accompanying drawings.

(Hardware Configuration)

The hardware configuration that may implement the technology described below will be described firstly with reference to FIG. 1.

The hardware configuration 100 includes, for example, a central processing unit (CPU) 110, a random access memory (RAM) 120, a read only memory (ROM) 130, a hard disk 140, an input device 150, an output device 160, a network interface 170, and a system bus 180. Furthermore, in one implementation, the hardware configuration 100 may be implemented by a computer, such as tablet, laptop, desktop, client server, or other suitable electronic devices. In another implementation, the hardware configuration 100 may be implemented by a monitor, such as digital camera, video camera, network camera, or other suitable electronic devices. Herein, in the case where the hardware configuration 100 is implemented by a monitor, the hardware configuration 100 also includes, for example, optical system 190.

Figure 6:
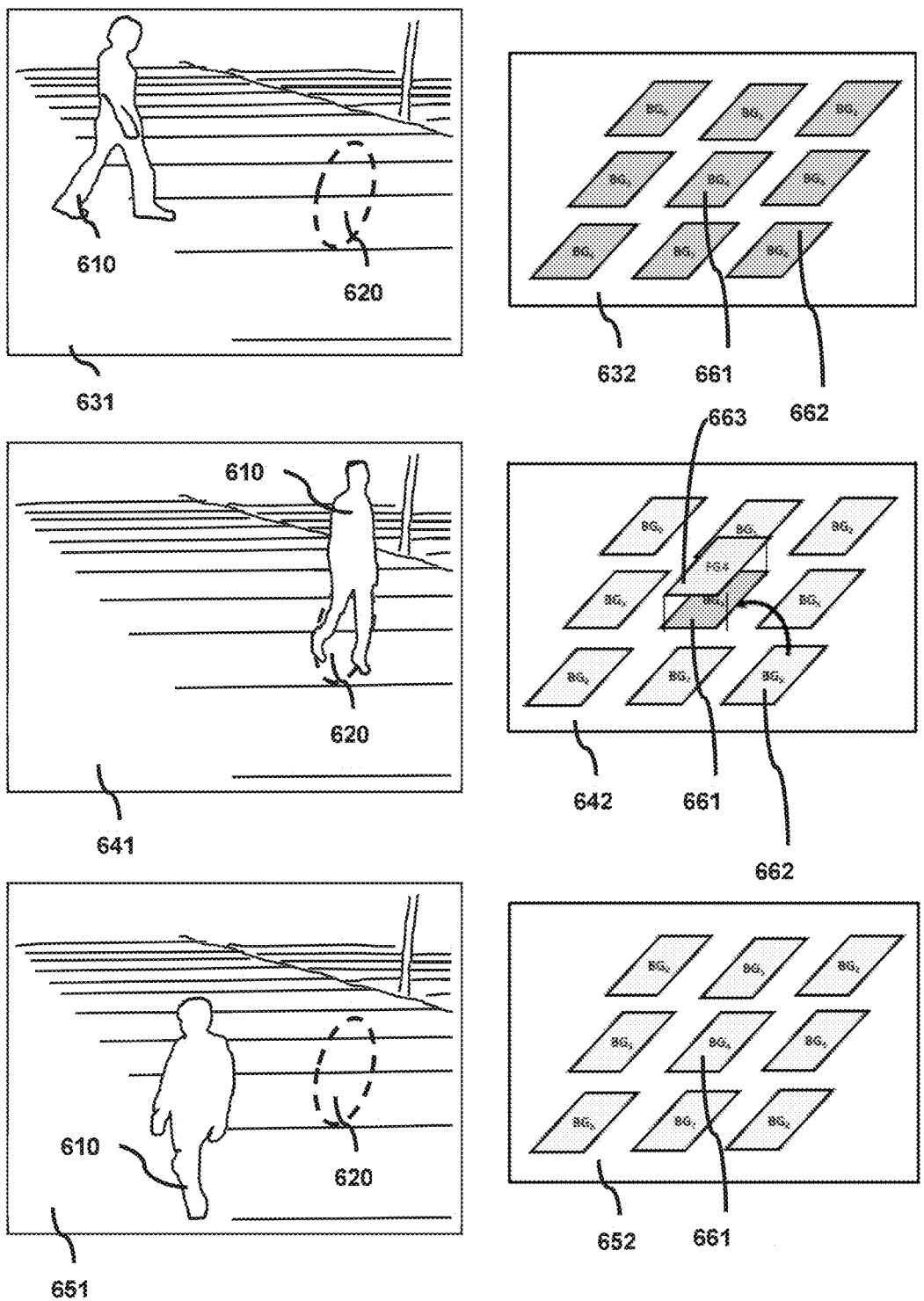
FIG. 6 schematically shows an exemplary application scene.

In one implementation, the image processing apparatus according to the present disclosure is configured by hardware or firmware and is used as a module or component of the hardware configuration 100. For example, the image processing apparatus 200, which will be described below in detail with reference to FIG. 2, and the image processing apparatus 600, which will be described below in detail with reference to FIG. 6, are used as modules or components of the hardware configuration 100. In another implementation, the image processing apparatus according to the present disclosure is configured by software stored in ROM 130 or hard disk 140 and executed by CPU 110. For example, the procedure 300, which will be described below in detail with reference to FIG. 3, is used as a program stored in the ROM 130 or the hard disk 140.

The CPU 110 is any suitable programmable control device such as a processor, and may execute various functions to be described below by executing various application programs stored in the ROM 130 or the hard disk 140 (e.g., a memory). The RAM 120 is used to temporarily store program or data loaded from the ROM 130 or the hard disk 140, and is also used as a space for the CPU 110 to execute various processes (such as, implementing a technique which will be described below in detail with reference to FIGS. 3 to 5) and other available functions therein. The hard disk 140 stores various information such as an operating system (OS), various applications, control programs, videos, scene models, processing results and/or predefined data (e.g., thresholds (THs)) of each video frame of the video.

In one implementation, the input device 150 is used to allow a user to interact with the hardware configuration 100. In one example, the user may input image/video/data through the input device 150. In another example, the user may trigger corresponding processing of the present disclosure through the input device 150. In addition, the input device 150 may adopt various forms, such as button, keyboard, or touch screen. In another implementation, the input device 150 is used to receive image/video output from specialized electronic device such as digital camera, video camera, and/or network camera. In addition, in the case where the hardware configuration 100 is implemented by a monitor, the optical system 190 in the hardware configuration 100 will directly capture image/video of a surveilled location.

In one implementation, the output device 160 is used to display processing results (such as the foreground) to the user. Moreover, the output device 160 may adopt various forms such as a cathode ray tube (CRT) or a liquid crystal display.

The network interface 170 provides an interface for connecting hardware configuration 100 to a network. For example, the hardware configuration 100 may perform data communication with other electronic devices connected via the network via the network interface 170. Alternatively, a wireless interface may be provided for the hardware configuration 100 to perform wireless data communication. The system bus 180 may provide a data transmission path for transmitting data to each other among the CPU 110, the RAM 120, the ROM 130, the hard disk 140, the input device 150, the output device 160, the network interface 170, and the optical system 190, and the like. Although referred to as a bus, the system bus 180 is not limited to any particular data transmission technique.

The above described hardware configuration 100 is merely illustrative and is in no way intended to limit the present disclosure and its application or use. Moreover, for the sake of brevity, only one hardware configuration is shown in FIG. 1. However, a plurality of hardware configurations may be used as needed.

(Image Processing)

Next, the image processing according to the present disclosure will be described with reference to FIGS. 2 to 6.

Figure 2:
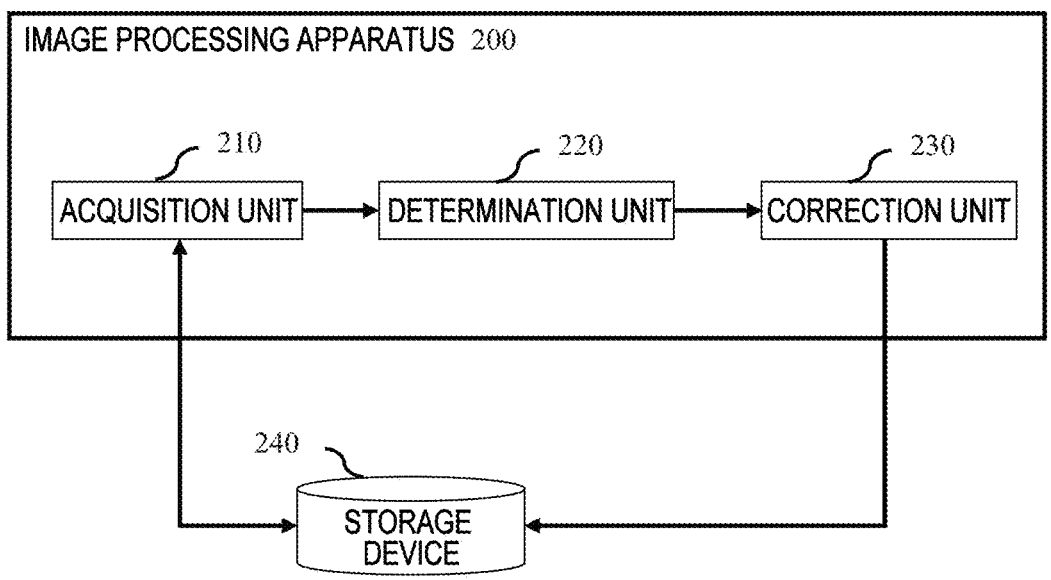
FIG. 2 is a block diagram illustrating the configuration of an image processing apparatus according to an embodiment of the present disclosure.
Figure 3:
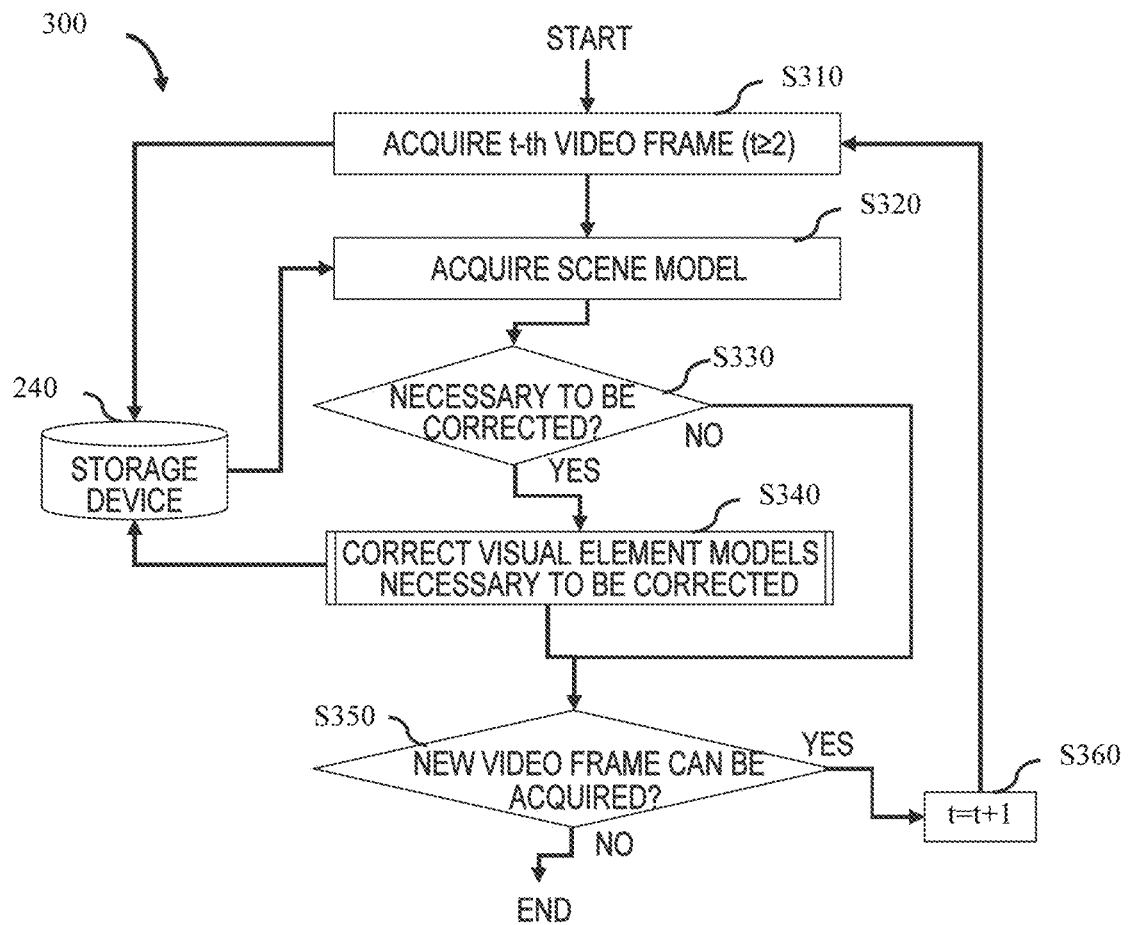
FIG. 3 schematically shows a flow chart of image processing according to an embodiment of the present disclosure.

FIG. 2 is a block diagram illustrating the configuration of an image processing apparatus 200 according to an embodiment of the present disclosure. Herein, some or all of the modules shown in FIG. 2 may be implemented by dedicated hardware. As shown in FIG. 2, the image processing apparatus 200 includes an acquisition unit 210, a determination unit 220, and a correction unit 230.

In addition, the storage device 240 shown in FIG. 2 stores for example video frames acquired from a video and processing results (e.g., corrected scene model, foreground detection result) for each video frame. For example, the video is input by a user or output from a specialized electronic device (e.g., a camera) or captured by the optical system 190 as described in FIG. 1. Alternatively, the acquired video frames and processing results may be stored in different storage devices. In one implementation, the storage device 240 is the ROM 130 or the hard disk 140 shown in FIG. 1. In another implementation, the storage device 240 is a server or an external storage device that is connected to the image processing apparatus 200 via a network (not shown).

First, in one implementation, for example, in the case where the hardware configuration 100 shown in FIG. 1 is implemented by a computer, the input device 150 receives a video output from a specialized electronic device (e.g., a network camera) or input by a user. Next, the input device 150 transmits the received video to the image processing apparatus 200 via the system bus 180. In another implementation, for example, in the case where the hardware configuration 100 is implemented by a monitor, the image processing apparatus 200 directly receives the video captured by the optical system 190.

Then, as shown in FIG. 2, on the one hand, the acquisition unit 210 acquires a current video frame from the received video (i.e., the input video) and stores it in the storage device 240. For example, the current video frame is the t-th video frame, where t is a natural number and t≥2. Herein, as described above, each video frame is composed of several visual elements. On the other hand, the acquisition unit 210 acquires a scene model from the storage device 240. Herein, the scene model includes visual element models that represent at least appearance features of visual elements in the current video frame and the previous video frames of the current video frame. In other words, the scene model is obtained based on the current video frame and the previous video frames of the current video frame. Herein, the visual element models obtained based on the previous video frames of the current video frame in the scene model are likely to be corrected by the correction unit 230. Herein, the appearance features of visual elements in the video frame include any one of color feature, texture feature, and illumination feature. Herein, as for one visual element, a plurality of visual element models corresponding to the visual element are included in the scene model. For example, it is assumed that the current video frame is the t-th video frame, then, as for one of the visual elements, 1~t visual element models corresponding to the visual element may be included in the scene model, wherein one visual element model represents at least appearance features of the visual element at the same position in one of the 1~t video frames. However, it is obviously not necessary to be limited thereto. As for one visual element in the t-th video frame, visual element models less than t corresponding to the visual element may also be included in the scene model.

After the current video frame and the scene model are obtained, the determination unit 220 determines, based on the visual elements in the current video frame, the visual element models in the scene model to be visual element models necessary to be corrected and visual element models unnecessary to be corrected. Thus, based on the determination result of the determination unit 220, the visual element models in the scene model may further represent additional features of the visual elements in the current video frame and its previous video frames, where the additional features include, for example, a history record that the visual element models in the scene model are determined to be visual element models necessary to be corrected and visual element models unnecessary to be corrected based on each video frame.

Then, the correction unit 230 corrects the visual element models necessary to be corrected based on reference visual element models. Herein, the reference visual element models are visual element models in the scene model that are determined to be the visual element models unnecessary to be corrected based on each of the current video frame and its previous video frames, wherein similarities among the appearance features of the reference visual element models and the visual element models necessary to be corrected in the previous video frames of the current video frame, satisfy a predetermined condition.

Finally, after the visual element models necessary to be corrected in the scene model are corrected, the correction unit 230 transmits the corrected scene model to the storage device 240 so that the scene model stored in the storage device 240 may be updated for the subsequent correction of scene model and/or for subsequent processing (e.g., the detection of foreground in current video frame).

In addition, in the case where the current video frame is the first video frame of the input video, the scene model is usually not corrected.

The flowchart 300 shown in FIG. 3 is a corresponding procedure of the image processing apparatus 200 shown in FIG. 2.

As shown in FIG. 3, in step S310, the acquisition unit 210 acquires the t-th video frame from the received video (i.e., the input video) and stores the t-th video frame into the storage device 240, wherein t≥2.

In step S320, the acquisition unit 210 acquires a scene model from the storage device 240.

Figure 4:
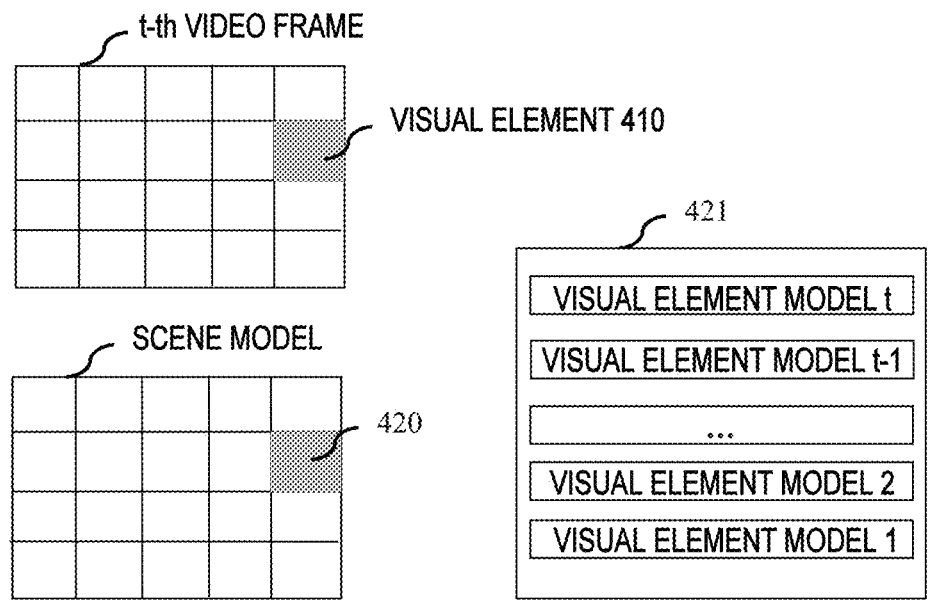
FIG. 4 schematically shows a current video frame, a scene model and samples of a visual element model included in a scene model.

In step S330, the determination unit 220 determines, based on the visual elements in the t-th video frame, the visual element models in the scene model to be visual element models necessary to be corrected and visual element models unnecessary to be corrected. It is assumed that each video frame is composed of N visual elements, wherein N is a natural number, then, as described above, as for the n-th visual element in the t-th video frame, 1~t visual element models corresponding to the visual element are included in the scene model. Taking the n-th visual element (the visual element 410 as shown in FIG. 4) in the t-th video frame as an example with reference to FIG. 4, an implementation that the determination unit 220 determines the corresponding 1~t visual element models in the scene model (420 as shown in FIG. 4, wherein 420 includes 1~t visual element models shown in 421) to be visual element models necessary to be corrected and visual element models unnecessary to be corrected is described below.

First, for each of the visual element models shown in 421, taking the visual element model 2 as an example, the determination unit 220 determines a difference between the appearance feature of the visual element model 2 and the appearance feature of the visual element 410. In one implementation, the difference is, for example, the similarity between the texture feature/color feature/illumination feature of the visual element model 2 and the texture feature/color feature/illumination feature of the visual element 410. Herein, the above described similarity is obtained, for example, by an existing matching method.

Then, for each of the 1~t visual element models, taking the visual element model 2 as an example, the determination unit 220 determines, based on the determined difference (e.g., the determined similarity), the visual element model 2 to be a visual element model necessary to be corrected or a visual element model unnecessary to be corrected. In one implementation, the determined similarity is compared with a predefined threshold (e.g., TH1), and in the case where the determined similarity is, for example, greater than or equal to TH1, the visual element model 2 is considered to be similar to the visual element 410, thereby the visual element model 2 is determined to be a visual element model unnecessary to be corrected. In other words, with respect to the visual element 410, the visual element model 2 belongs to a correct or reliable visual element model. That is to say, the visual element model 2 belongs to a visual element model that can change following closely the change of the environment. Conversely, in the case where the determined similarity is, for example, less than TH1, the visual element model 2 is considered to be not similar to the visual element 410, thereby the visual element model 2 is determined to be a visual element model necessary to be corrected. In other words, with respect to the visual element 410, the visual element model 2 belongs to a visual element model that becomes incorrect or unreliable due to the change of the environment.

Returning to FIG. 3, for the visual element models necessary to be corrected determined by the determination unit 220, in step S340, the correction unit 230 corrects these visual element models necessary to be corrected based on reference visual element models. As described above, for the n-th visual element in the t-th video frame, it is assumed that a total of M visual element models among the corresponding 1~t visual element models in the scene model are determined to be visual element models necessary to be corrected, wherein M is a natural number and 1≤M≤t. Then, for each of the M visual element models necessary to be corrected, taking the m-th visual element model necessary to be corrected as an example, in one implementation, the correction unit 230 corrects the visual element model necessary to be corrected with reference to FIG. 5.

Figure 5:
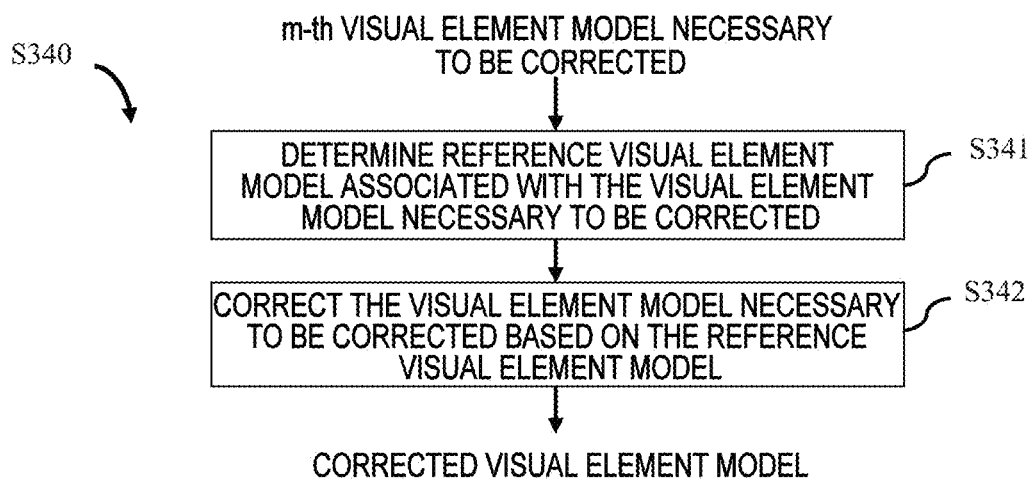
FIG. 5 schematically shows a flow chart of step S340 as shown in FIG. 3 according to an embodiment of the present disclosure.

As shown in FIG. 5, in step S341, the correction unit 230 determines a reference visual element model associated with the m-th visual element model necessary to be corrected from the scene model. In one implementation, the correction unit 230 determines the reference visual element model by the following manner.

First, the correction unit 230 searches for visual element models, that are determined to be visual element models unnecessary to be corrected based on not only the t-th video frame but also the previous video frames of the t-th video frame (for example, the (t−1)-th video frame, or several frames before the t-th video frame), from the visual element models around the m-th visual element model necessary to be corrected. In other words, the found visual element models are actually visual element models that can change following closely the change of the environment (i.e., be correct or reliable). As described above, the visual element models in the scene model may represent additional features of the visual elements in the current video frame and its previous video frames. Therefore, the correction unit 230 may search for the visual element models that satisfy requirements, for example, based on the additional features of the visual element models around the m-th visual element model necessary to be corrected.

Next, for each of the found visual element models, the correction unit 230 determines the similarity between the appearance feature (e.g., texture feature, color feature, illumination feature) of the visual element model and the appearance feature of the m-th visual element model necessary to be corrected.

Then, the correction unit 230 determines, from the found visual element models, a reference visual element model that may be associated with the m-th visual element model necessary to be corrected, based on a predetermined condition and the determined similarity. In one implementation, the correction unit 230 selects one visual element model with the highest similarity from the found visual element models as the reference visual element model associated with the m-th visual element model necessary to be corrected. In another implementation, the correction unit 230 selects any one from the found visual element models with a similarity greater than or equal to a predefined threshold (e.g., TH2), for example, as the reference visual element model associated with the m-th visual element model necessary to be corrected.

Returning to FIG. 5, after the reference visual element model associated with the m-th visual element model necessary to be corrected is determined, in step S342, the correction unit 230 corrects the m-th visual element model necessary to be corrected, based on the difference between the appearance features of the determined reference visual element model in the t-th video frame and in the previous video frames of the t-th video frame. In one implementation, the correction unit 230 corrects the m-th visual element model necessary to be corrected by the following manner.

First, the correction unit 230 calculates a feature difference between a texture feature/color feature/illumination feature of the reference visual element model in the t-th video frame and a texture feature/color feature/illumination feature of the reference visual element model in the video frame in which the reference visual element model is located. Then, the correction unit 230 superimposes the calculated feature difference onto the texture feature/color feature/illumination feature of the m-th visual element model necessary to be corrected by a manner of direct superposition or weighted superposition to achieve the purpose of correcting the visual element model.

Returning to FIG. 3, after the visual element models necessary to be corrected in the scene model are corrected based on the t-th video frame, on the one hand, the correction unit 230 stores the corrected scene model in the storage device 240 for subsequent processing, such as, the subsequent correction of the scene model, and the detection of the foreground in the t-th video frame. On the other hand, in step S350, the correction unit 230 judges whether a new video frame can be acquired by the acquisition unit 210. In the case where a new video frame cannot be acquired, the procedure of flowchart 300 ends. In the case where a new video frame can be acquired, in step S360, t=t+1 is set, and the corresponding operations from step S310 to step S350 are repeatedly performed.

As described above, according to the present disclosure, it is possible to find visual element models that can change following closely the change of the environment (i.e., be correct or reliable), and thus the visual element models in the scene model that become incorrect or unreliable due to the change of the environment may be corrected.

Hereinafter, taking a person who is walking through a street as an example with reference to FIG. 6, as shown in FIG. 6, video frame 631 shows that the person 610 is moving towards to the area 620, video frame 641 shows that the person 610 has reached to the area 620, video frame 651 shows that the person 610 has moved away from the area 620. As for the visual elements in and around the area 620, for example, 632 and 642 and 652 show the corresponding visual element models in the scene model, wherein the visual element models 661 and 663 are the visual element models corresponding to the area 620 for example.

Assuming that video frame 631 is the previous video frame, and in the previous video frame, the visual element models are determined as background visual element models (i.e. "$BG_0$"~"$BG_8$" in 632).

Assuming that video frame 641 is the current video frame, and assuming that there are two visual element models (i.e. 661 and 663) corresponding to the area 620. Wherein, in the current video frame, the visual element model 661 is determined as a visual element model necessary to be corrected, the visual element model 663 is determined as a visual element model unnecessary to be corrected. Assuming that the visual element model 662 is determined as a visual element unnecessary to be corrected both in the current video frame and in the previous video frame. As for the visual element model 661, assuming that the visual element model 662 is the reference visual element model associated with the visual element model 661, thereby, the visual element model 661 could be corrected via the visual element model 662 according to the present disclosure.

In video frame 651, since the visual element model 661 has been corrected according to the present disclosure, after the person 610 moved away from the area 620, the visual element model 661 will be determined as the background visual element model rather than wrongly determined as the foreground visual element model. Wherein, in case the Related Art is applied in this situation rather than the present disclosure is applied, after the person 610 moved away from the area 620, the visual element model 661 will be wrongly determined as the foreground visual element model.

Figure 7:
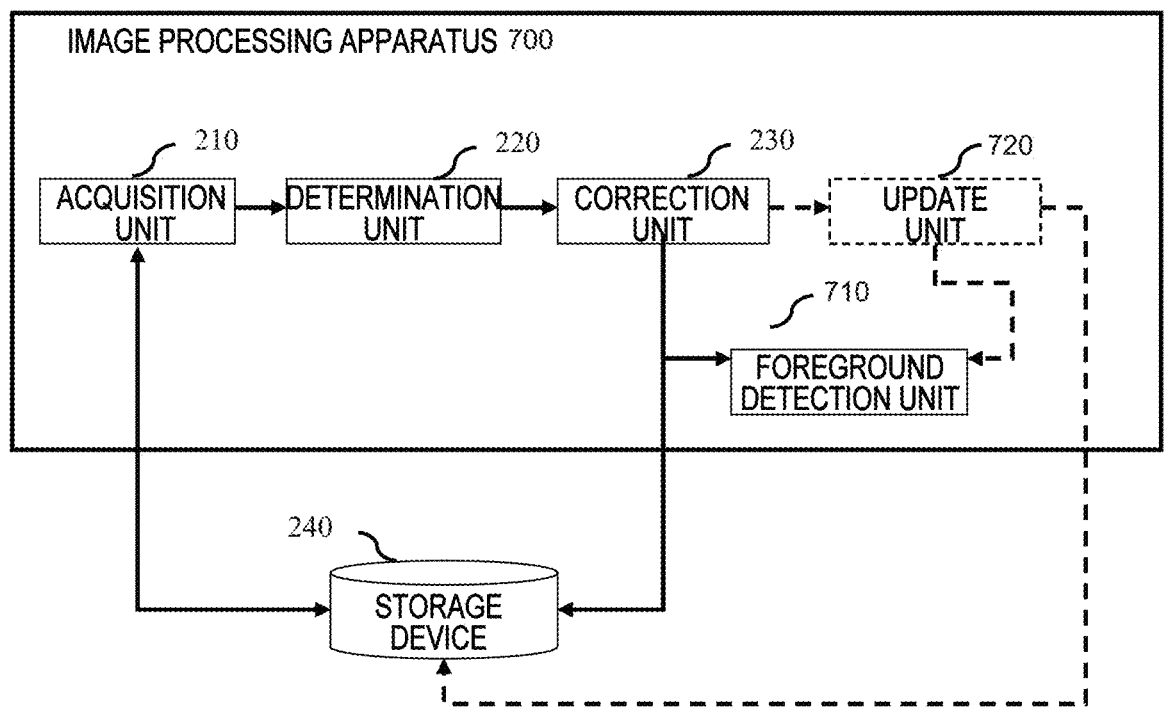
FIG. 7 is a block diagram illustrating a configuration of an image processing apparatus for foreground detection according to an embodiment of the present disclosure.

As described above, the scene model corrected according to the present disclosure may be used for foreground detection, and thus, as an exemplary application of the present disclosure, FIG. 7 is a block diagram illustrating the configuration of an image processing apparatus 700 for foreground detection according to an embodiment of the present disclosure. Herein, some or all of the modules shown in FIG. 7 may be implemented by dedicated hardware. As shown in FIG. 7, the image processing apparatus 700 includes an acquisition unit 210, a determination unit 220, a correction unit 230, and a foreground detection unit 710.

On the one hand, since the acquisition unit 210, the determination unit 220, the correction unit 230, and the storage device 240 shown in FIG. 7 are the same as the corresponding portions shown in FIG. 2, detailed description of these portions will not be repeated here.

On the other hand, as shown in FIG. 7, after the correction unit 230 corrects the scene model based on the t-th video frame acquired by the acquisition unit 210, the foreground detection unit 710 detects the foreground from the t-th video frame based on the corrected scene model, for example, by using the existing background subtraction technique.

Further, in order to further improve the processing accuracy of the foreground detection, in addition that the visual element models necessary to be corrected in the scene model may be corrected, the visual element models unnecessary to be corrected in the scene model may be further updated. Accordingly, the image processing apparatus 700 shown in FIG. 7 may further include an update unit 720. The update unit 720 updates the visual element models unnecessary to be corrected in the corrected scene model based on the t-th video frame. For example, the appearance features of the visual element models unnecessary to be corrected are replaced directly with the appearance features of the visual elements in the t-th video frame that correspond to the visual element models unnecessary to be corrected.

After the corrected scene model is updated by the update unit 720, on the one hand, the foreground detection unit 710 detects the foreground from the t-th video frame based on the updated scene model. On the other hand, the update unit 720 stores the updated scene model in the storage device 240 for subsequent processing, for example, the subsequent correction of scene model.

As described above, according to the present disclosure, the visual element models in the scene model that become incorrect or unreliable due to the change of the environment may be corrected, thereby the influence of the change of the environment on the foreground detection may be also effectively reduced, and thus the processing accuracy of the foreground detection may be improved.

Figure 8:
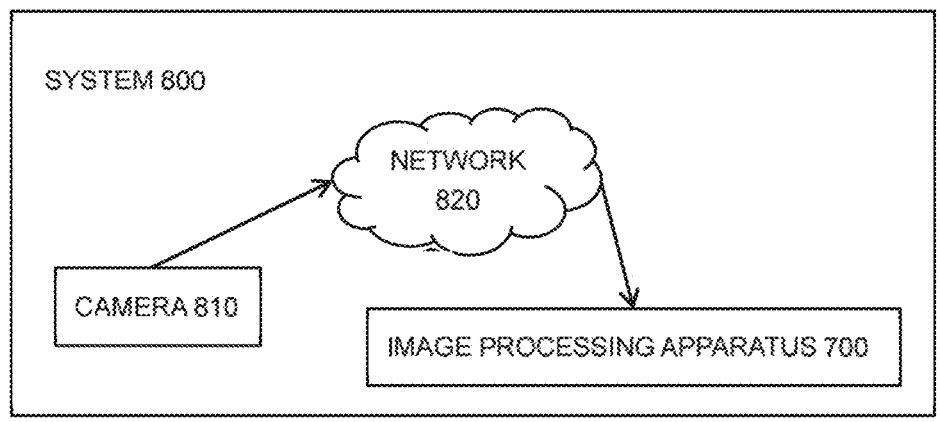
FIG. 8 illustrates the arrangement of an exemplary application system according to the present disclosure.

In addition, the present disclosure could be implemented by a computer (e.g. a client server) or could be implemented by a monitor (e.g. a network camera). As an application, as for the image processing apparatus 700 shown in FIG. 7, taking it is implemented by a client server for example, FIG. 8 illustrates the arrangement of an exemplary application system 800 of the image processing apparatus 700. As shown in FIG. 8, the system 800 comprises at least one camera (e.g. network camera) 810 and the image processing apparatus 700, wherein the at least one camera 810 and the image processing apparatus 700 are connected with each other via a network 820.

As shown in FIG. 8, firstly, the camera 810 continuously captures a video of a place of interest and transfers the captured video to the image processing apparatus 700 via the network 820.

And then, the image processing apparatus 700 corrects the scene model and detects the foreground from the video frames of the captured video with reference to FIG. 2 to FIG. 7.

All of the above described units are exemplary and/or preferred modules for implementing the processes described in this disclosure. These units may be hardware units, such as field programmable gate arrays (FPGAs), digital signal processors, application specific integrated circuits, etc. and/or software modules, such as computer readable programs. The units for implementing each of the steps are not described exhaustively above. However, when there is a step to perform a particular procedure, there may be a corresponding functional module or a unit (implemented by hardware and/or software) for implementing the same procedure. The technical solutions of all combinations of the steps described and the units corresponding to these steps are included in the disclosed content of the present application, as long as the technical solutions constituted by them are complete and applicable.

The method and apparatus of the present disclosure may be implemented in a plurality of manners. For example, the method and apparatus of the present disclosure may be implemented by software, hardware, firmware, or any combination thereof. The above described order of steps of the present method is intended to be merely illustrative, and the steps of the method of the present disclosure are not limited to the order specifically described above unless specified otherwise. Furthermore, in some embodiments, the present disclosure may also be embodied as a program recorded in a recording medium, which includes machine readable instruction for implementing the method according to the present disclosure. Accordingly, the present dislcosure also encompasses a recording medium storing a program for implementing the method according to the present disclosure.

While some specific embodiments of the present disclosure have been shown in detail by way of examples, it is to be understood by those skilled in the art that the above described examples are intended to be merely illustrative and do not limit the scope of the disclosure. It is to be understood by those skilled in the art that the above described embodiments may be modified without departing from the scope and spirit of the disclosure. The scope of the present disclosure is defined by the appended claims.

What is claimed is:

1. An image processing apparatus comprising:
    an acquisition unit that acquires a current video frame and a scene model based on an input video, wherein the scene model includes visual element models that represent at least appearance features of visual elements in the current video frame and its previous video frames;
    a determination unit that determines, based on the visual elements in the current video frame, the visual element models in the scene model to be visual element models necessary to be corrected and visual element models unnecessary to be corrected; and
    a correction unit that corrects the visual element models necessary to be corrected based on reference visual element models,
    wherein the reference visual element models are visual element models in the scene model, that are determined to be the visual element models unnecessary to be corrected based on each of the current video frame and its previous video frames, and
    wherein similarities among the appearance features of the reference visual element models and the visual element models necessary to be corrected in the previous video frames, satisfy a predetermined condition.

2. The image processing apparatus according to claim 1, wherein, for any one of the visual elements in the current video frame, the determination unit determines a visual element model corresponding to the visual element in the scene model to be the visual element model necessary to be corrected or the visual element model unnecessary to be corrected, based on a difference between an appearance feature of the visual element and an appearance feature of the visual element model corresponding to the visual element.

3. The image processing apparatus according to claim 1, wherein, for any one of the visual element models necessary to be corrected, the correction unit corrects an appearance feature of the visual element model necessary to be corrected, based on a difference between the appearance features of a reference visual element model associated with the visual element model necessary to be corrected in the current video frame and in the previous video frames.

4. The image processing apparatus according to claim 1, wherein the appearance features include any one of texture feature, color feature, and illumination feature.

5. The image processing apparatus according to claim 1, further comprising:
    a foreground detection unit that detects a foreground from the current video frame based on a corrected scene model.

6. The image processing apparatus according to claim 5, further comprising:
    an update unit that updates the visual element models unnecessary to be corrected in the corrected scene model based on the current video frame,
    wherein the foreground detection unit detects the foreground from the current video frame based on an updated scene model.

7. An image processing method comprising:
an acquiring step of acquiring a current video frame and a scene model based on an input video, wherein the scene model includes visual element models that represent at least appearance features of visual elements in the current video frame and its previous video frames;
a determining step of determining, based on the visual elements in the current video frame, the visual element models in the scene model to be visual element models necessary to be corrected and visual element models unnecessary to be corrected; and
a correcting step of correcting the visual element models necessary to be corrected based on reference visual element models,
wherein the reference visual element models are visual element models in the scene model, that are determined to be the visual element models unnecessary to be corrected based on each of the current video frame and its previous video frames, and
wherein similarities among the appearance features of the reference visual element models and the visual element models necessary to be corrected in the previous video frames, satisfy a predetermined condition.

8. The image processing method according to claim 7, wherein in the determining step, for any one of the visual elements in the current video frame, a visual element model corresponding to the visual element in the scene model is determined to be the visual element model necessary to be corrected or the visual element model unnecessary to be corrected, based on a difference between an appearance feature of the visual element and an appearance feature of the visual element model corresponding to the visual element.

9. The image processing method according to claim 7, wherein in the correcting step, for any one of the visual element models necessary to be corrected, an appearance feature of the visual element model necessary to be corrected is corrected, based on a difference between the appearance features of a reference visual element model associated with the visual element model necessary to be corrected in the current video frame and in the previous video frames.

10. A non-transitory computer-readable storage medium storing an instruction for executing an image processing method comprising:
an acquiring step of acquiring a current video frame and a scene model based on an input video, wherein the scene model includes visual element models that represent at least appearance features of visual elements in the current video frame and its previous video frames;
a determining step of determining, based on the visual elements in the current video frame, the visual element models in the scene model to be visual element models necessary to be corrected and visual element models unnecessary to be corrected; and
a correcting step of correcting the visual element models necessary to be corrected based on reference visual element models,
wherein the reference visual element models are visual element models in the scene model, that are determined to be the visual element models unnecessary to be corrected based on each of the current video frame and its previous video frames, and
wherein similarities among the appearance features of the reference visual element models and the visual element models necessary to be corrected in the previous video frames, satisfy a predetermined condition.

* * * * *